(12) United States Patent
Shibazaki

(10) Patent No.: US 7,573,517 B2
(45) Date of Patent: Aug. 11, 2009

(54) IMAGE-CAPTURING DEVICE THAT UTILIZES A SOLID STATE IMAGE CAPTURING ELEMENT AND ELECTRONIC CAMERA

(75) Inventor: Kiyoshige Shibazaki, Higashimurayama (JP)

(73) Assignee: Nikon Corporation, Tokyo (JP)

( * ) Notice: Subject to any disclaimer, the term of this patent is extended or adjusted under 35 U.S.C. 154(b) by 694 days.

(21) Appl. No.: 10/981,515

(22) Filed: Nov. 5, 2004

(65) Prior Publication Data
US 2005/0062865 A1    Mar. 24, 2005

Related U.S. Application Data

(63) Continuation of application No. 09/500,988, filed on Feb. 15, 2000, now abandoned.

(30) Foreign Application Priority Data
Sep. 21, 1999   (JP)   ............................ 11-267166

(51) Int. Cl.
 H04N 5/335   (2006.01)
 H04N 3/14   (2006.01)
(52) U.S. Cl. ..................................... 348/300; 348/311
(58) Field of Classification Search .................. 348/294, 348/300, 301, 302, 311, 316
See application file for complete search history.

(56) References Cited

U.S. PATENT DOCUMENTS

| 5,841,126 | A | 11/1998 | Fossum et al. |
| 6,340,864 | B1 | 1/2002 | Wacyk |
| 6,552,324 | B1 | 4/2003 | Kothari et al. |
| 6,567,125 | B1 | 5/2003 | Shimizu |
| 6,940,553 | B1 * | 9/2005 | Katoh .......................... 348/311 |

FOREIGN PATENT DOCUMENTS

| JP | A-1-141463 | 6/1989 |
| JP | A-3-286671 | 12/1991 |
| JP | 9-163218 | 6/1997 |
| JP | 09163218 A * | 6/1997 |
| JP | A-10-191183 | 7/1998 |

* cited by examiner

*Primary Examiner*—Justin P Misleh
(74) *Attorney, Agent, or Firm*—Oliff & Berridge, PLC

(57) ABSTRACT

An image-capturing device includes: a plurality of photoelectric conversion elements that are two-dimensionally arrayed; a charge transfer circuit that transfers electrical charges from the photoelectric conversion elements; and an amplifier that is connected to an end of the charge transfer circuit along a direction of charge transfer, converts an electrical charge into voltage, and amplifies the voltage, and at least the photoelectric conversion elements, the charge transfer circuit and the amplifier are provided on a single semiconductor substrate. And the image-capturing device further includes an amplifier power control circuit that controls power to the amplifier in conformance to a control signal provided from outside.

7 Claims, 7 Drawing Sheets

IMAGE-CAPTURING DEVICE THAT UTILIZES A SOLID STATE IMAGE CAPTURING ELEMENT AND ELECTRONIC CAMERA

This is a Continuation of application Ser. No. 09/500,988 filed Feb. 15, 2000. The entire disclosure of the prior application is hereby incorporated by reference herein in its entirety.

INCORPORATION BY REFERENCE

The disclosure of the following priority application is herein incorporated by reference:

Japanese Patent Application No. 11-267166, filed Sep. 21, 1999

BACKGROUND OF THE INVENTION

1. Field of the Invention

The present invention relates to an image-capturing device that utilizes a solid image-capturing element and an electronic camera provided with the image-capturing device.

2. Description of the Related Art

Image-capturing devices in the known art include those that employ two-dimensionally arrayed photoelectric conversion elements such as photodiodes to convert light to electrical charges corresponding to the light intensity distribution, transfer the stored charges from the individual photoelectric conversion elements to a floating diffusion amplifier via a charge transfer element such as a CCD (charge-coupled device) and generate an output achieved by converting the stored charges to voltages and amplifying them.

FIG. 5 illustrates the structure of an image-capturing device in the prior art.

A plurality of photoelectric conversion elements 1 are two-dimensionally arrayed on a semiconductor substrate (silicon substrate) 20. A charge transfer element 2 is provided in correspondence to each column of photoelectric transfer elements 1 to transfer the stored charges in the direction of the column. A charge transfer element 3 that transfers electrical charges in the direction of the row is connected at the ends of the individual column charge transfer elements 2 along the direction of their charge transfer so that the charges that have been transferred in the direction of the column are further transferred in the direction of the rows. A floating diffusion amplifier 4 is connected to the end of the row charge transfer element 3 along the direction of its charge transfer to output voltages achieved by converting the electrical charges to voltages and then amplifying them through an output terminal 8.

In this specification, the floating diffusion amplifier, which is connected at the end of charge transfer elements along the direction of transfer and converts the transferred charges to voltages and then amplifies them, is to be simply referred to as an "output amplifier."

The output amplifier 4 is connected to a positive source 7 and is also connected to a negative source 6 via a resistor 5, with a bias current corresponding to a source voltage applied between the positive source 7 and the negative source 6 flowing through the output amplifier 4. The resistor 5 is a resistor provided for bias current adjustment. It is to be noted that while power is supplied to the photoelectric conversion elements 1 and the charge transfer elements 2 and 3, the illustration of their power circuits is omitted.

However, in the image-capturing device in the prior art described above, in which the photoelectric conversion elements 1, the charge transfer elements 2 and 3 and the output amplifier 4 are provided on a single semiconductor substrate 20, the heat generated at the output amplifier 4, which generates a great deal of heat, is communicated to the photoelectric conversion elements 1 in the vicinity over time, as illustrated in FIG. 6. As a result, the photoelectric conversion elements 1 located closer to the heat source, i.e., the output amplifier 4, become heated to generate a large dark current, which, in turn, raises the black level of the image signal, as shown in FIG. 7, to cause a so-called "dark current shading" in the vicinity of the heat source.

SUMMARY OF THE INVENTION

An object of the present invention is to prevent occurrence of dark current shading attributable to heat locally generated in an image-capturing device.

In order to attain the above object, an image-capturing device according to the present invention comprises: a plurality of photoelectric conversion elements that are two-dimensionally arrayed; a charge transfer circuit that transfers electrical charges from the photoelectric conversion elements; and an amplifier that is connected to an end of the charge transfer circuit along a direction of charge transfer, converts an electrical charge into voltage, and amplifies the voltage, and at least the photoelectric conversion elements, the charge transfer circuit and the amplifier are provided on a single semiconductor substrate. And the image-capturing device further comprises an amplifier power control circuit that controls power to the amplifier in conformance to a control signal provided from outside.

In this image-capturing device, it is preferred that the amplifier power control circuit changes a bias current supplied to the amplifier by using the control signal.

Also, it is preferred that the charge transfer circuit transfers the electrical charges to the amplifier by employing a CCD (charge-coupled device).

Also, it is preferred that the charge transfer circuit reads the electrical charges out to the amplifier through XY address scanning.

An electronic camera according to the present invention comprises: an image-capturing device that captures an image of a subject and outputs image data; and a control device that performs a specific type of image processing on the image data. The image-capturing device comprises: a plurality of photoelectric conversion elements that are two-dimensionally arrayed; a charge transfer circuit that transfers electrical charges from the photoelectric conversion elements; and an amplifier that is connected to an end of the charge transfer circuit along a direction of charge transfer, converts an electrical charge into voltage, and amplifies the voltage. At least the photoelectric conversion elements, the charge transfer circuit and the amplifier are provided on a single semiconductor substrate. And the image-capturing device further comprises an amplifier power control circuit that controls power to the amplifier in conformance to a control signal provided from outside.

In this electronic camera, it is preferred that the control device controls the image-capturing device so that a normal bias current is supplied to the amplifier in conformance to the control signal when discharging unnecessary electrical charges and reading out electrical charges from the photoelectric conversion elements, and the bias current to the amplifier is reduced in conformance to the control signal at other times. In this case, it is preferred that the control device controls the image-capturing device so that the normal bias current is supplied to the amplifier in conformance to the control signal when exposure is performed over a length of time equal to or less than a specific length of time.

An image-capturing device according to the present invention comprises: a plurality of photoelectric conversion elements; and a heat generating component that constitutes a local heat source. The plurality of photoelectric conversion elements and the heat generating component are provided on a single semiconductor substrate. And the image-capturing device further comprises a heat generating component power control circuit that controls power to the heat generating component in conformance to a control signal provided from outside.

In this image-capturing device, it is preferred that the plurality of photoelectric conversion elements are two-dimensionally arrayed on the semiconductor substrate.

Also, it is preferred that the heat generating component is an A/D converter.

Also, it is preferred that the heat generating component is a signal processor.

DESCRIPTION OF THE PREFERRED EMBODIMENTS

Figure 1:
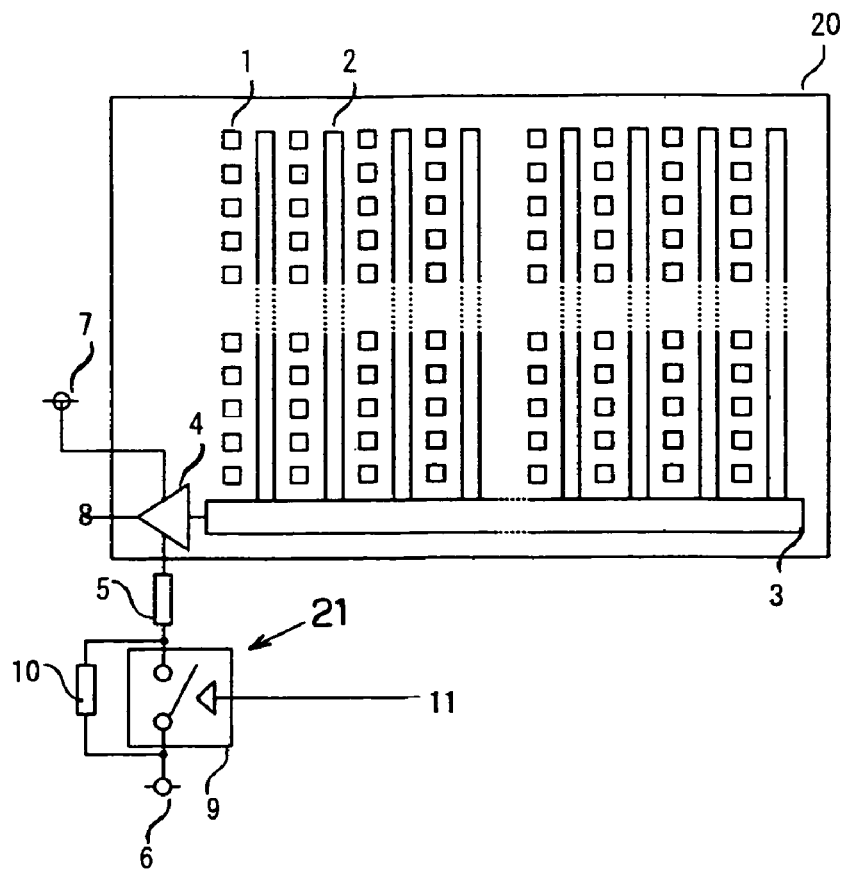
FIG. 1 illustrates the structure adopted in an embodiment.
Figure 2:
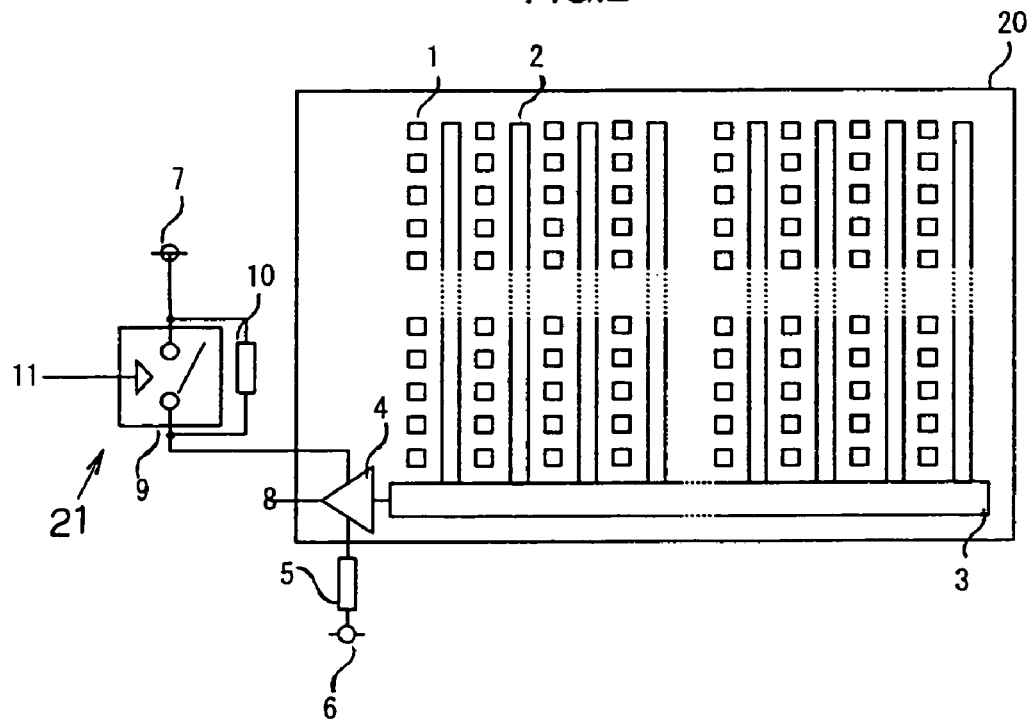
FIG. 2 illustrates the structure adopted in an embodiment.
Figure 5:
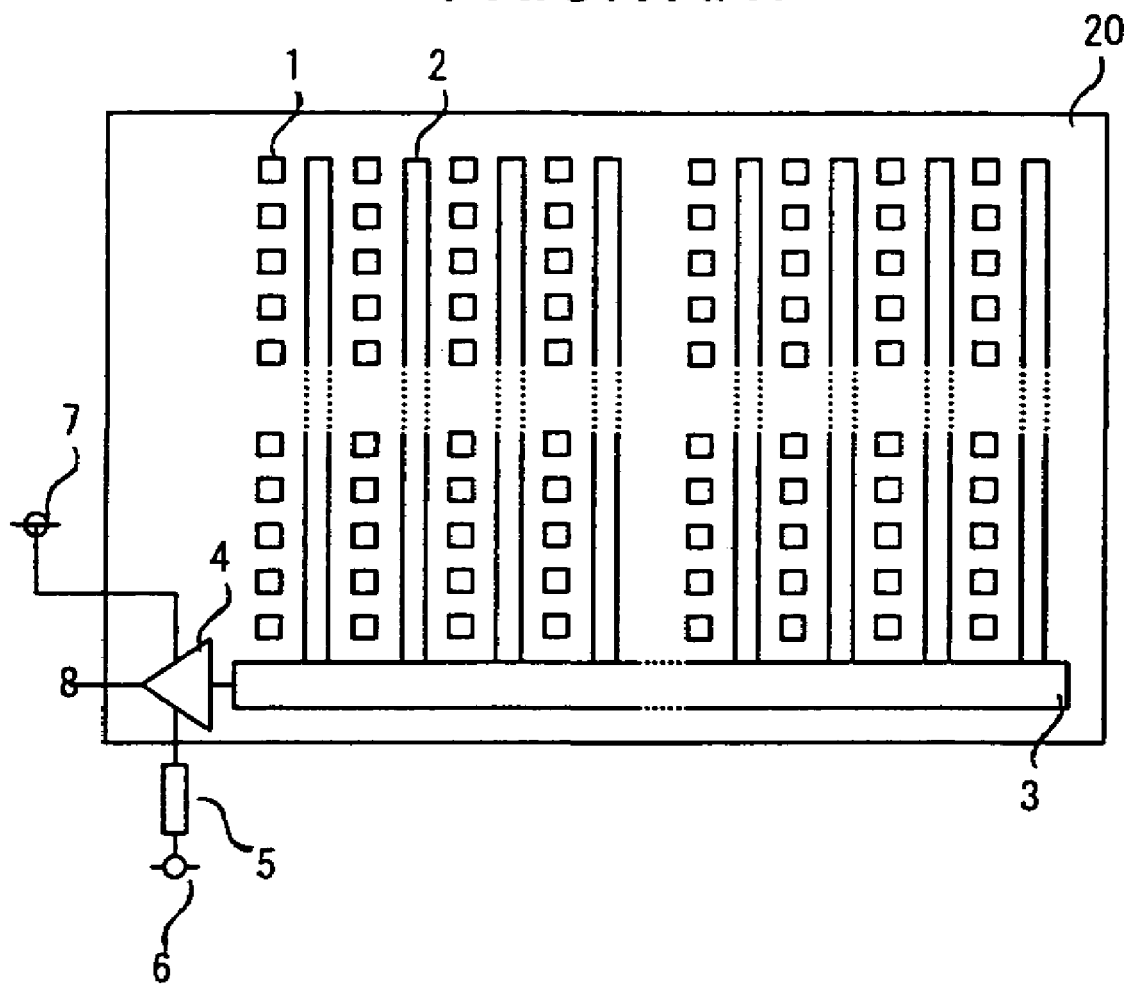
FIG. 5 illustrates the structure adopted in an image-capturing device in the prior art.
Figure 6:
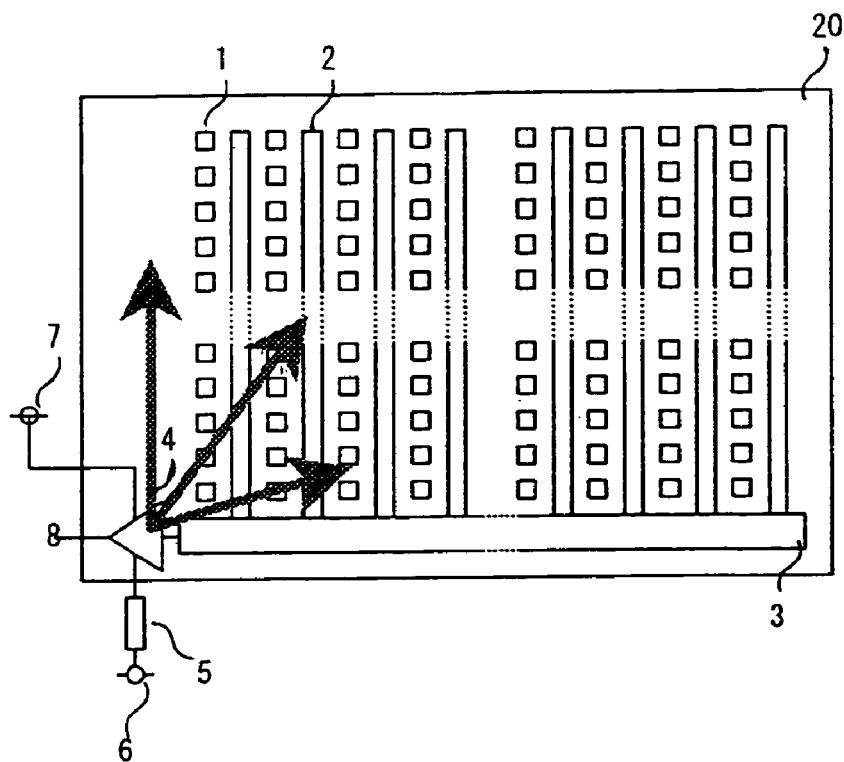
FIG. 6 illustrates the problems of the image-capturing device in the prior art.
Figure 7:
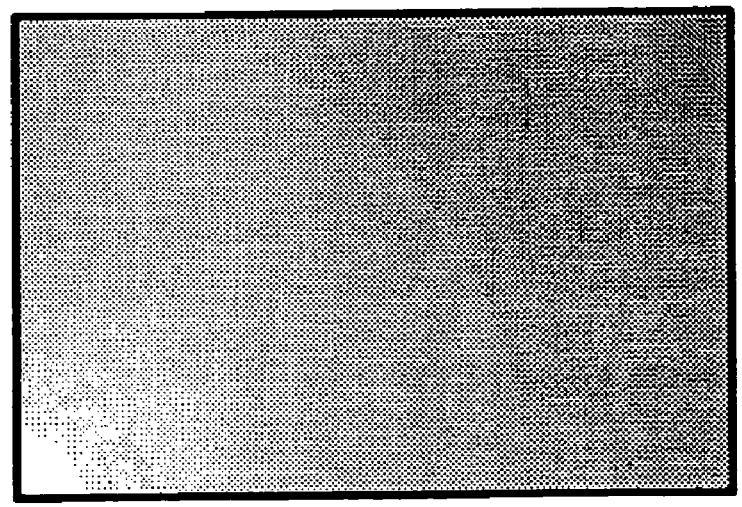
FIG. 7 illustrates dark current shading occurring in the image-capturing device in the prior art.

FIGS. 1 and 2 illustrate structures adopted in embodiments. It is to be noted that the explanation proceeds by assigning the same reference numbers to components similar to those constituting the image-capturing device in the prior art shown in FIG. 5.

A plurality of photoelectric conversion elements 1 such as phototransistors are two-dimensionally arrayed on a semiconductor substrate (silicon substrate) 20 and a charge transfer element 2 such as a CCD is provided in correspondence to each column of photoelectric conversion elements to transfer stored electrical charges along the direction of the column. In addition, a charge transfer element 3 that transfers charges in the direction of the row is connected at the ends of the individual column charge transfer elements 2 along their transfer direction, to further transfer the electrical charges along the direction of the row. A floating diffusion amplifier, i.e., an output amplifier 4, is connected to the end of the row charge transfer element 3 along its transfer direction to output voltages achieved by converting the electrical charges to voltages and then amplifying them to an external image processing circuit or the like through an output terminal 8.

In the image-capturing device in the prior art described earlier, the output amplifier 4 provided on the semiconductor substrate 20 together with the photoelectric conversion elements 1 and the charge transfer elements 2 and 3 becomes a local heat source to cause occurrence of "dark current shading."

Accordingly, in this embodiment, an amplifier power control circuit 21 that controls the power to the output amplifier 4 constituting a local heat source to minimize the heat generation at the output amplifier 4 by suppressing the bias current at the output amplifier 4 when it is not necessary to operate the output amplifier 4, is added in the image-capturing device to prevent occurrence of dark current shading.

FIG. 1 illustrates an example in which the amplifier power control circuit 21 is provided on the side where a negative source 6 is located and FIG. 2 illustrates an example in which the amplifier power control circuit 21 is provided on the side where a positive source 7 is located.

The amplifier power control circuit 21 is constituted of a parallel circuit comprising a switch element 9 which is opened/closed by a control signal 11 and a resistor 10. The control signal 11, which is provided from the outside of the image-capturing device, changes the bias current at the output amplifier 4 by opening/closing the switch element 9. The resistor 10 is provided to adjust the bias current when it is not necessary to operate the output amplifier 4, and a resistor 5 adjusts the normal bias current flowing when it is necessary to operate the output amplifier 4.

During a "charge transfer," in which electrical charges are transferred by the charge transfer elements 2 and 3 to the output amplifier 4 where they undergo charge/voltage conversion and amplification, the control signal 11 closes the switch element 9 to short the resistor 10 and supply a normal bias current I set by the resistor 5 to the output amplifier 4. Such a charge transfer during which the output amplifier 4 needs to operate includes transfer of unnecessary charges described below in addition to an image-capturing charge transfer, in which image-capturing charges at the photoelectric conversion elements 1 are transferred to the output amplifier 4 by the charge transfer elements 2 and 3 to be output to the outside through the output amplifier 4. Namely, it includes the transfer of unnecessary charges in which some of the unnecessary charges are transferred to the output amplifier 4 by the charge transfer elements 2 and 3 and are discharged to the outside via the output amplifier 4 during the processing for discharging unnecessary charges implemented before a long exposure period and also prior to a charge read following the long exposure period.

When the output amplifier 4 does not need to operate, i.e., during a "charge non-transfer," in which neither the image-capturing charges nor the unnecessary charges are transferred, the control signal 11 opens the switch element 9 to insert the resistor 10 in series to the resistor 5 to reduce the bias current at the output amplifier 4 to its control value I'.

It is to be noted that although power is supplied to the photoelectric conversion elements 1 and the charge transfer elements 2 and 3, the illustration of their power circuits is omitted in FIGS. 1 and 2. In addition, the negative source 6 may be a ground line or a 0V line.

Now, a method of determining a resistance value R10 at the resistor 10 required to adjust the bias current I' during a charge non-transfer is explained.

For instance, in order to set the bias current I' at the output amplifier 4 during a charge non-transfer to $1/10$ of the normal bias current I during a charge transfer, the resistance value R10 at the resistor 10 may be set as below.

$$I=E/(R5+ZA)$$

$$I'=E/(R5+R10+ZA)$$

$$I'/I=1/10$$

thus; $R10=9*(R5+ZA)$

In the equations above, ZA represents the impedance of the power circuit of the output amplifier 4, R5 represents the resistance value of the resistor 5 and E represents the source voltage applied between the positive source 7 and the negative source 6.

It is to be noted that while the bias current I' at the output amplifier 4 for a charge non-transfer is set to 1/10 of the normal bias current I for a charge transfer in this embodiment, the setting of the bias current I' for the charge non-transfer is not limited to this example, and it may be set at any level as long as it does not allow occurrence of dark current shading attributable to the heat generated at the output amplifier 4 at least when the shutter speed resulting in a long exposure period is set. The bias current I' at the output amplifier 4 for the charge non-transfer may be set to 0, and in such a case, the resistance value R10 at the resistor 10 should be set to an infinite value, i.e., the resistor 10 should be eliminated.

In addition, the amplifier power control circuit 21 may be provided on the semiconductor substrate 20. In this case, power from the positive source 7 and the negative source 6 and the control signal 11 are provided to the amplifier power control circuit 21 on the semiconductor substrate 20.

Figure 9:
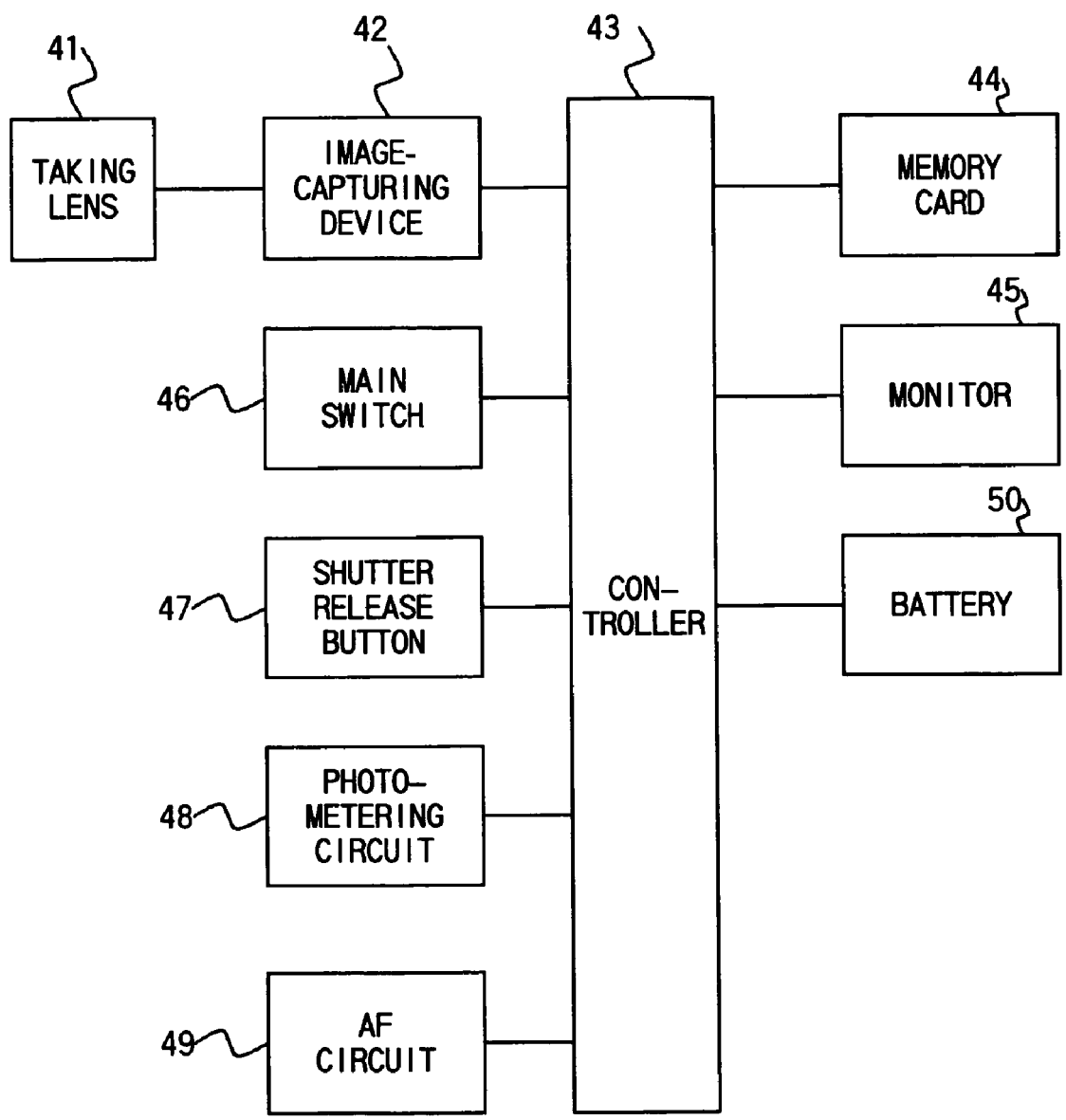
FIG. 9 illustrates a schematic structure of an electronic camera.

FIG. 9 presents a schematic structure of an electronic camera provided with the image-capturing device described above. A taking lens 41 forms a subject image on the light receiving surface of an image-capturing device 42. The image-capturing device 42 captures an image of the subject and outputs image data obtained through the image-capturing operation to a controller 43. The controller 43 performs a specific type of image processing on the input image data and stores the processed image data in a memory card 44. At this time, compression processing is performed as necessary. At a monitor 45, the subject image captured by the image-capturing device 42 or a subject image reproduced by using the data stored in the memory card 44 is displayed. A main switch 46 is operated to turn on/off the power to the electronic camera and a shutter release button 47 is operated to issue an instruction for an image capturing start. The controller 43 is also connected with a photometering circuit 48, an AF circuit 49 and a battery 50.

Figure 3:
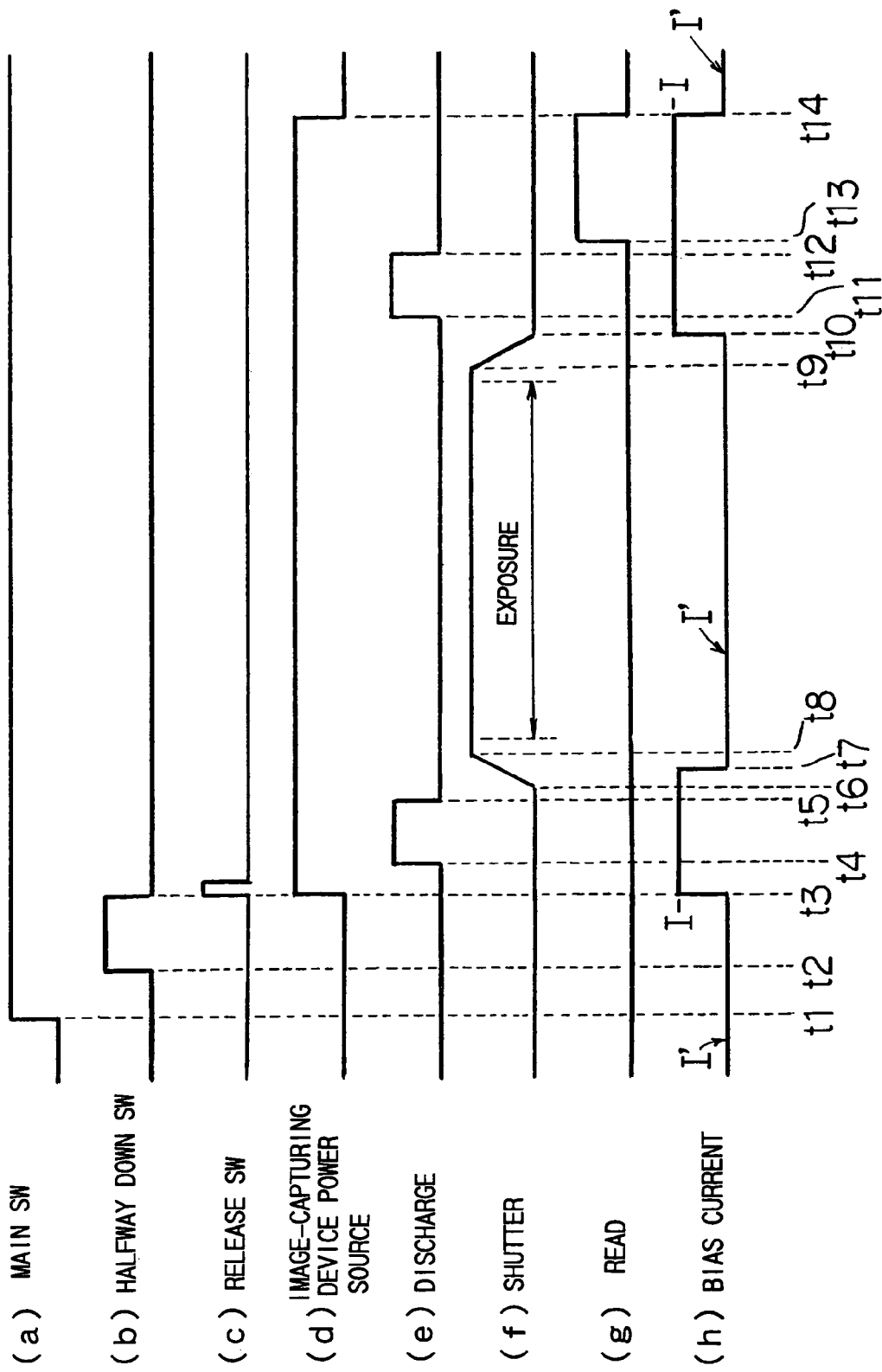
FIG. 3 presents a time chart of an image-capturing operation performed when a long exposure period is set.

FIG. 3 is a time chart of the image-capturing operation performed when the exposure period extends longer than a specific length of time (the shutter speed is lower than a specific value).

When the main switch 46 of the electronic camera is turned on at a time point t1, the camera starts an operation. At a time point t2, a halfway down switch (not shown), which is turned on when the shutter release button 47 is pressed halfway down enters an on state, photometering is performed by the photometering circuit 48 and based upon the photometering results, the shutter speed, i.e., the exposure period, is set. At the same time, the focal adjustment state of the taking lens 41 is detected by the AF circuit 49, and based upon the focal point detection results, focal adjustment is performed at the taking lens.

When the shutter release button 47 is pressed all the way down and the release switch (not shown) is turned on at a time point t3, power from the positive source 7 and the negative source 6 is supplied to the output amplifier 4 in the image-capturing device and also power (not shown) is supplied to the photoelectric conversion elements 1 and the charge transfer elements 2 and 3. Concurrently with the power supply, the switch element 9 is closed by the control signal 11 and the normal bias current I for a charge transfer is supplied to the output amplifier 4. The power supplied by the positive source 7 and the negative source 6 and the power supplied to the photoelectric conversion elements 1 and the charge transfer elements 2 and 3 is generated by the battery 50.

During the period of time elapsing between a time point t4 and a time point t5 after the shutter release until the shutter actually starts to open, a transfer operation by the charge transfer elements 2 and 3 is implemented to discharge unnecessary charges at the photoelectric conversion elements 1 and at the charge transfer elements 2 and 3 to an overflow drain (not shown) provided parallel to the charge transfer element 3. At this time, since the unnecessary charges cannot be completely discharged to the overflow drain, the normal bias current I is supplied to the output amplifier 4 by closing the switch element 9 with the control signal 11 to enable the output amplifier 4 to operate so that the unnecessary charges that cannot be discharged to the overflow drain are discharged to the outside of the image-capturing device through the output terminal 8 via the output amplifier 4.

At a time point t7 after the unnecessary charges are discharged, the control signal 11 opens the switch element 9, and the bias current at the output amplifier 4 is reduced to the control value I' to prevent heat generation from occurring at the output amplifier 4 during exposure. It is to be noted that the bias current at the output amplifier 4 may be promptly reduced at the time point t5, at which the processing for discharging unnecessary charges is completed.

At a time point t6, at which a specific length of time has elapsed after the completion of the processing for discharging unnecessary charges at the time point t5, the shutter starts to open. While the shutter enters a full open state at a time point t8, the exposure starts when a certain length of time has elapsed following the time point t8, and accordingly, the bias current at the output amplifier 4 is reduced at a time point preceding at least the time point t8 at which the shutter becomes fully open. During the exposure, the photoelectric conversion elements 1 store charges corresponding to the light intensity levels.

When the exposure is completed, the shutter is closed at a time point t9, and instead of starting the read of stored charges at time point t10 immediately after the shutter becomes completely closed, unnecessary charges stored at the charge transfer elements 2 and 3 are discharged again after the long exposure period. This processing for discharging the unnecessary charges is implemented prior to the processing for reading out the stored charges since, as the exposure period extends longer, the quantity of unnecessary charges stored at the charge transfer elements 2 and 3 increases to a degree that cannot be disregarded. The unnecessary charges stored during the exposure are disposed of by discharging unnecessary charges to the overflow drain as in the pre-exposure discharge processing and also by discharging some of the unnecessary charges that cannot be discharged to the overflow drain to the outside of the image-capturing device through the output terminal 8 via the output amplifier 4. In other words, the control signal 11 closes the switch element 9 at the time point t10 to enable operation of the output amplifier 4 by supplying the normal bias current I, and at a time point t11, the discharge processing is started by engaging the charge transfer elements 2 and 3 in a transfer operation.

When the processing for discharging unnecessary charges ends at a time point t12, the charge transfer elements 2 and 3 start an operation to transfer the stored charges, i.e., the image-capturing charges, at a time point t13. It is to be noted that since the processing for reading out the stored charges starts immediately after the unnecessary charges accumulated during the exposure are discharged, the switch element 9 is sustained in a closed state by the control signal 11, and the normal bias current I for a charge transfer is continuously supplied to the output amplifier 4. In the stored charge read processing, the charges stored at the photoelectric conversion elements 1 during the exposure are guided to the output amplifier 4 via the charge transfer elements 2 and 3, and the transferred charges are sequentially converted to voltages and then amplified at the output amplifier 4, to be ultimately output to an external image processing circuit (not shown) through the output terminal 8.

When the stored charge read processing ends at a time point t14, the power supply to the output amplifier 4 from the positive source 7 and the negative source 6 and the power supply to the photoelectric conversion elements 1 and the charge transfer elements 2 and 3, are stopped and, at the same time, the switch element 9 is opened by the control signal 11.

As described above, in the image-capturing device having the plurality of two-dimensionally arrayed photoelectric conversion elements 11 the charge transfer elements 2 and 3 that transfer electrical charges from the individual photoelectric conversion elements 1 and the output amplifier 4 connected at the ends of the charge transfer elements 2 and 3 along the direction of charge transfer to convert the charges to voltages and then amplify them, all provided on a single semiconductor substrate 20, the amplifier power control circuit 21 provided to control the power to the output amplifier 4 in conformance to the control signal 11 provided from the outside varies the bias current at the output amplifier 4 in response to the control signal 11. Thus, it is possible to supply power, i.e., the normal bias current I, to the output amplifier 4 only when necessary. In more specific terms, the normal bias current I is supplied to the output amplifier 4 only when unnecessary charges are discharged and image-capturing charges are read, i.e., only when it is necessary to engage the charge transfer elements 2 and 3 to transfer electrical charges to the output amplifier 4 and to achieve charge/voltage conversion and amplification at the output amplifier 4, and the bias current is reduced to the control value I' lower than the normal bias current I at other times. Consequently, the local heat generation occurring at the output amplifier 4 can be minimized so that an increase in the dark current caused by the photoelectric conversion elements 1 that have become heated in the vicinity of the output amplifier 4 is prevented, to ultimately avoid occurrence of dark current shading in the captured image. In addition, since the bias current at the output amplifier 4 is reduced when it is not necessary to operate the output amplifier 4, battery consumption at the electronic camera is minimized.

Figure 4:
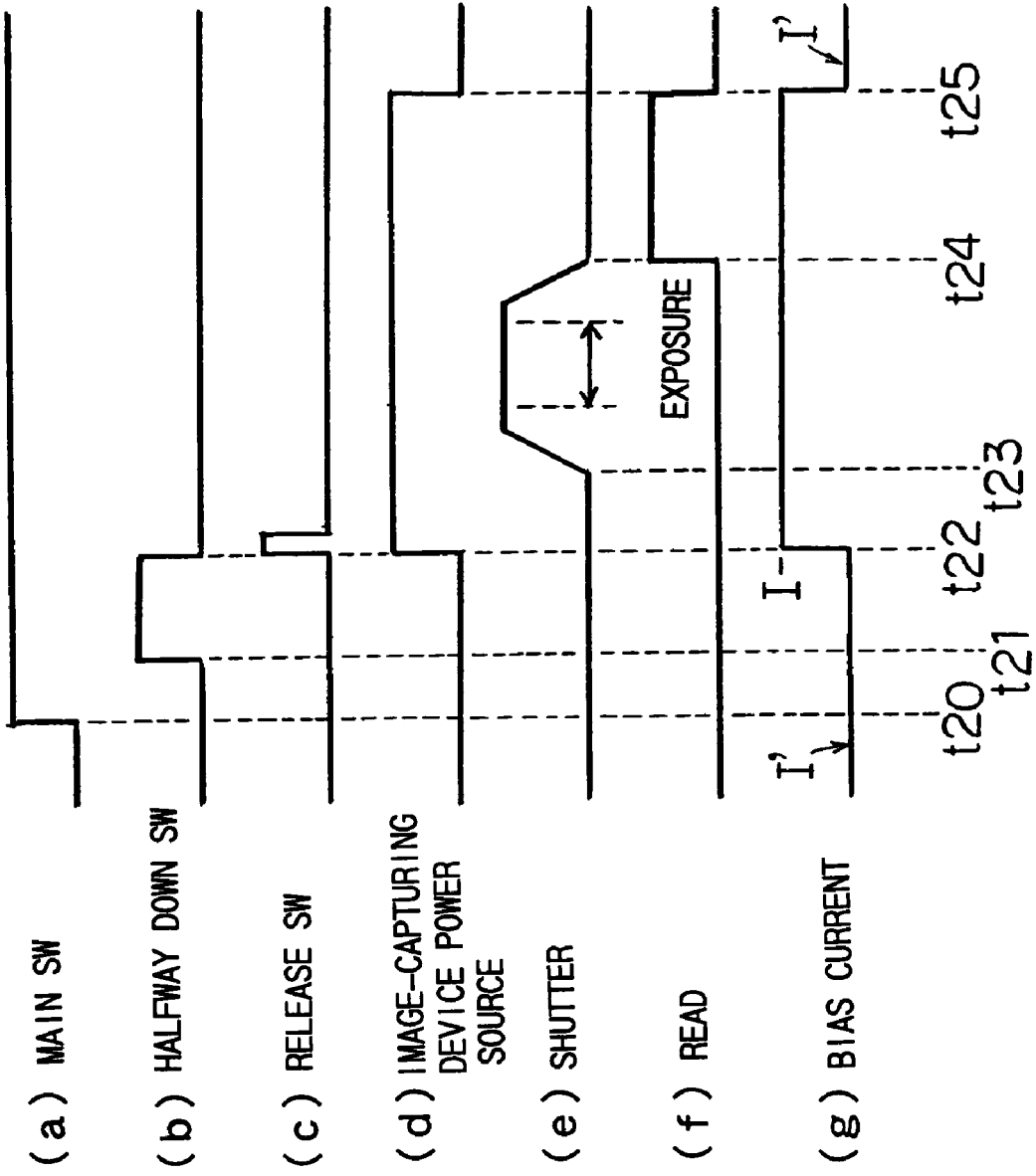
FIG. 4 presents a time chart of an image-capturing operation performed when a short exposure period is set.

FIG. 4 is a time chart of the image-capturing operation performed when the exposure period does not exceed the specific length of time (the shutter speed is fast, achieving a value smaller than the specific value) in an electronic camera provided with the image-capturing device described above.

When the exposure period is short, achieving a value equal to or less than the specific value, the accumulated quantity of unnecessary charges is small and, as a result, it is not necessary to implement the discharge processing, which, in turn, results in a reduction in the length of time to elapse during the series of image-capturing steps, from the shutter release to the end of the charge read. Thus, during the period of time over which the series of image-capturing steps are implemented, the quantity of heat generated at the output amplifier 4 is small, even if the normal bias current I is continuously supplied to the output amplifier 4 and, therefore, the photoelectric conversion elements 1 in the vicinity of the output amplifier 4 do not become heated to increase the dark current.

The main switch 46 is turned on and the subsequent operation up to the shutter release is performed as in the case in which the exposure period is long, illustrated in FIG. 3. When the shutter release button 47 is pressed all the way down and the release switch (not shown) is turned on at a time point t22, power from the positive source 7 and the negative source 6 is supplied to the output amplifier 4 in the image-capturing device 42 and also power (not shown) is supplied to the photoelectric conversion elements 1 and the charge transfer elements 2 and 3. Concurrently with the power supply, the switch element 9 is closed by the control signal 11 to supply the normal bias current I for charge transfer to the output amplifier 4.

Subsequently, the shutter is opened and exposure is performed, i.e., storage of charges corresponding to the intensity of light is performed by the photoelectric conversion elements 1 at time point t23~t24. When the exposure ends and the shutter is closed, the processing for reading out the stored charges immediately starts at the time point t24. The charge transfer elements 2 and 3 perform a charge transfer operation, the charges stored at the photoelectric conversion elements 1 during the exposure are guided to the output amplifier 4 via the charge transfer elements 2 and 3, and the transferred charges are sequentially converted to voltages, are then amplified at the output amplifier 4 and are output to an external controller (image processing circuit) 43 through the output terminal 8.

When the stored charge read processing ends at a time point t25, the power supply to the output amplifier 4 from the positive source 7 and the negative source 6 and the power supply to the photoelectric conversion elements 1 and the charge transfer elements 2 and 3, are stopped and, at the same time, the switch element 9 is opened by the control signal 11.

As described above, the normal bias current I is supplied to the output amplifier 4 by the control signal 11 when the exposure is performed over a period of time shorter than the specific length of time. When the exposure period is short, even if the normal bias current I is supplied to the output amplifier 4, the quantity of heat generated the output amplifier 4 is small since the bias current I is supplied only briefly and, therefore, the photoelectric conversion elements 1 in the vicinity of the output amplifier 4 are not heated to cause dark current shading. Rather, by supplying the normal bias current I to the output amplifier 4 during the exposure, the output amplifier 4 achieves a stable state even during the exposure so that the image-capturing charges can be read out in a stable manner immediately after the exposure to achieve a reduction in the overall length of the image-capturing operation.

An optimal value for each individual image-capturing device should be selected by taking into consideration the quantities of the photoelectric conversion elements 1 and the charge transfer elements 2 and 3, their arrangement and the position of the output amplifier 4, when setting the specific length of time with respect to the exposure period used in the decision making as to whether or not the bias current to the output amplifier 4 is to be reduced.

It is to be noted that while the explanation is given in reference to the embodiment on an example in which the present invention is adopted in an image-capturing device that reads charges at the photoelectric conversion elements by employing charge transfer elements, the present invention may be also adopted in an image-capturing device that reads charges at the photoelectric conversion elements through XY address scanning, a typical example of which is a MOS image-capturing device, as long as the charges read out are converted to voltages and are then amplified by the output amplifier provided on the same substrate. In such a case, too, advantages similar to those achieved in the embodiment are realized.

In addition, while a single output amplifier 4 is employed in the embodiment described above, the present invention may be also adopted in an image-capturing device in which a plurality of photoelectric conversion elements are divided into a plurality of groups, stored charges are read by employing charge transfer elements in the individual groups and charge/voltage conversion and amplification are implemented by providing an output amplifier in correspondence to each group at the end of the charge transfer elements along the direction of transfer. In such a case, too, advantages similar to those achieved in the embodiment are realized.

Figure 8:
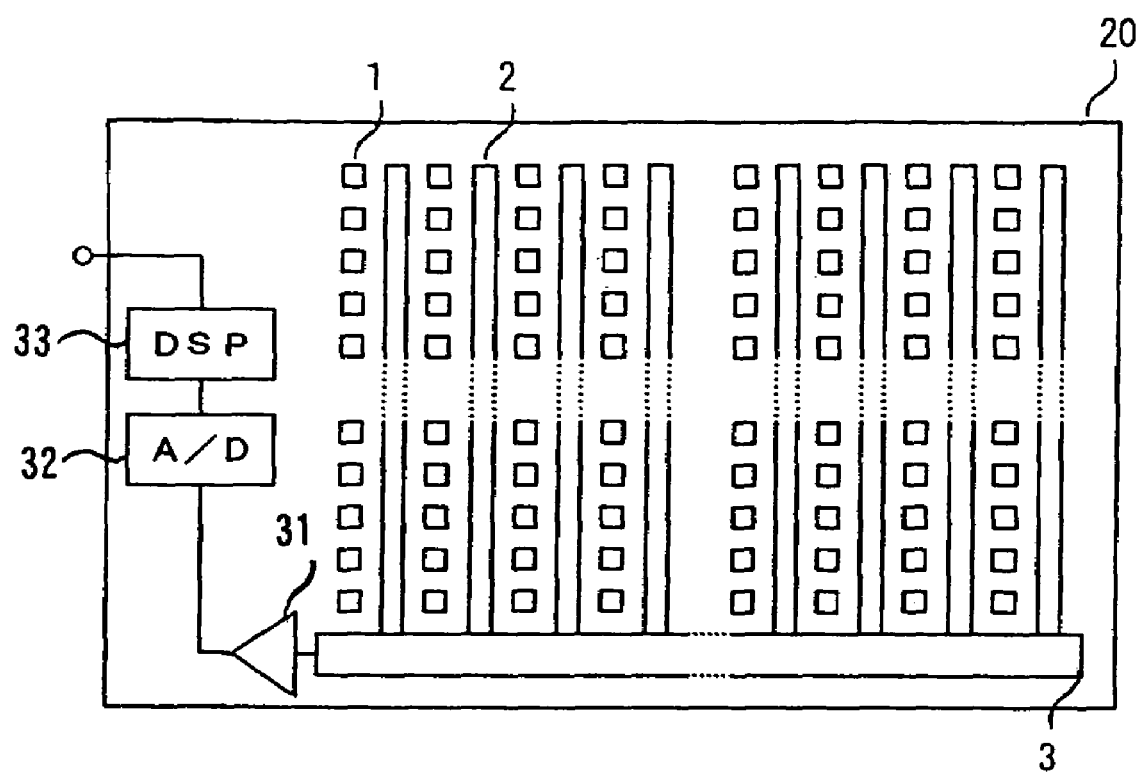
FIG. 8 illustrates a variation of the structure adopted in an embodiment.

While an explanation is given above in reference to the embodiment on an example in which the heat source that increases the dark current at the photoelectric conversion elements is an output amplifier, the heat source is not limited to an output amplifier. For instance, in a CMOS image-capturing device, an amplifier 31, an A/D converter 32 or a signal processor 33 such as a DSP may be mounted on the semiconductor substrate 20 together with the photoelectric conversion elements 1, as illustrated in FIG. 8. As explained earlier, the amplifier 31 constitutes a local heat source, and in addition to the amplifier 31, the A/D-converter 32 and the signal processor 33, too, generate greater quantities of heat as they are driven at higher speeds to become local heat-sources. Thus, the present invention can be adopted in an image-capturing device having local heat sources such as the A/D converter 32 and the signal processor 33 mounted on the semiconductor substrate 20 together with the photoelectric conversion elements 1. In such a case, by controlling power supply to the A/D converter 32 and the signal processor 33 to supply power only when their operation is necessitated and reducing the bias current when they need not operate, heat generation can be suppressed, to achieve advantages similar to those realized in the embodiment explained earlier.

While an electronic camera provided with the image-capturing device according to the present invention is explained in reference to the embodiment, the image-capturing device according to the present invention may be mounted at an apparatus other than an electronic camera. In other words, the present invention may be adopted in all types of apparatuses that are provided with an image-capturing device, including scanners and facsimile machines. It is to be noted that the electronic camera may be an electronic still camera that photographs still images or a video camera that records dynamic images.

While the photoelectric conversion elements 1 are arrayed two-dimensionally in the embodiment explained above, the present invention is not limited to these details. For instance, the present invention may be adopted in a structure achieved by arraying photoelectric conversion elements one-dimensionally. In other words, the present invention may be adopted in all types of image-capturing devices each having an array of a plurality of photoelectric conversion elements 1 in which the photoelectric conversion elements 1 are thermally affected by another circuit provided on the same semiconductor substrate.

What is claimed is:

1. An electronic camera comprising:
   an image-capturing device that captures an image of a subject and outputs image data; and
   a control device that controls an image-capturing operation including an exposure operation, wherein said image-capturing device comprises:
   a plurality of photoelectric conversion elements that are two-dimensionally arrayed;
   a charge transfer circuit that transfers electrical charges from said photoelectric conversion elements; and
   an amplifier that is connected to an end of said charge transfer circuit along a direction of charge transfer, sequentially converts each of the electrical charges into voltage, and amplifies the voltage, wherein:
   at least said photoelectric conversion elements, said charge transfer circuit and said amplifier are provided on a single semiconductor substrate;
   said image-capturing device further comprises an amplifier power control circuit that changes a bias current supplied to said amplifier in conformance to a control signal provided from the control device; and
   said control device outputs said control signal to said amplifier power control circuit so that a normal bias current is supplied to said amplifier in conformance to said control signal when discharging unnecessary electrical charges and reading out electrical charges from said photoelectric conversion elements, and a reduced bias current that is less than the normal bias current and more than zero is supplied to said amplifier in conformance to said control signal at other times.

2. An electronic camera according to claim 1, wherein:
   said control device outputs said control signal to said amplifier power control circuit so that the reduced bias current is supplied to said amplifier in conformance to said control signal during said exposure operation.

3. An electronic camera according to claim 1, wherein said charge transfer circuit transfers the electrical charges to said amplifier by employing a CCD (charge-coupled device).

4. An electronic camera according to claim 1, wherein said charge transfer circuit reads the electrical charges out to said amplifier through XY address scanning.

5. An electronic camera comprising:
   an image-capturing device that captures an image of a subject and outputs image data; and
   a control device that controls an image-capturing operation including an exposure operation, wherein said image-capturing device comprises;
   a plurality of photoelectric conversion elements that are two-dimensionally arrayed;
   a charge transfer circuit that transfers electrical charges from said photoelectric conversion elements; and
   an amplifier that is connected to an end of said charge transfer circuit along a direction of charge transfer, sequentially converts each of the electrical charges into voltage, and amplifies the voltage, wherein;
   at least said photoelectric conversion elements, said charge transfer circuit and said amplifier are provided on a single semiconductor substrate;
   said image-capturing device further comprises an amplifier power control circuit that changes a bias current supplied to said amplifier in conformance to a control signal provided from the control device; and
   said control device judges whether or not said exposure operation is performed over a length of time equal to or less than a specific length of time, outputs said control signal to said amplifier power control circuit so that a normal bias current is supplied to said amplifier in conformance to said control signal during reading out electrical charges from said photoelectric conversion elements and a reduced bias current that is less than the normal bias current and more than zero is supplied to said amplifier in conformance to said control signal during said exposure operation when said exposure operation is performed over a length of time longer than the specific length of time, and outputs said control signal to said amplifier power control circuit so that the normal bias current is supplied to said amplifier in conformance to said control signal even during said exposure operation when said exposure operation is performed over a length of time equal to or less than the specific length of time.

6. An electronic camera according to claim 5, wherein said charge transfer circuit transfers the electrical charges to said amplifier by employing a CCD (charge-coupled device).

7. An electronic camera according to claim 5, wherein said charge transfer circuit reads the electrical charges out to said amplifier through XY address scanning.

* * * * *